(12) United States Patent
Okuno et al.

(10) Patent No.: US 7,657,140 B2
(45) Date of Patent: Feb. 2, 2010

(54) OPTICAL CABLE MODULE

(75) Inventors: Toshiaki Okuno, Nara (JP); Hayami Hosokawa, Kyoto (JP); Naru Yasuda, Uji (JP); Akihiko Sano, Uji (JP); Junichi Tanaka, Nara (JP); Hiroto Nozawa, Yokohama (JP); Hirokatsu Nakayama, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 12/295,786

(22) PCT Filed: Apr. 9, 2007

(86) PCT No.: PCT/JP2007/057836

§ 371 (c)(1),
(2), (4) Date: Oct. 2, 2008

(87) PCT Pub. No.: WO2007/116998

PCT Pub. Date: Oct. 18, 2007

(65) Prior Publication Data

US 2009/0110350 A1 Apr. 30, 2009

(30) Foreign Application Priority Data

Apr. 7, 2006 (JP) .............................. 2006-106984

(51) Int. Cl.
*G02B 6/30* (2006.01)
*G02B 6/26* (2006.01)
*G02B 6/42* (2006.01)
*G02B 6/36* (2006.01)

(52) U.S. Cl. .............................. 385/49; 385/31; 385/38; 385/39; 385/47; 385/88; 385/90

(58) Field of Classification Search .................... 385/31, 385/38, 39, 47, 49, 88, 90
See application file for complete search history.

(56) References Cited

U.S. PATENT DOCUMENTS 4,092,061 A * 5/1978 Stigliani, Jr. .................. 385/33

(Continued)

FOREIGN PATENT DOCUMENTS

JP 8-75957 A 3/1996

(Continued)

OTHER PUBLICATIONS

International Search Report w/translation from PCT/JP2007/057836 dated Jun. 26, 2007 (8 pages).

(Continued)

*Primary Examiner*—Frank G Font
*Assistant Examiner*—Ryan Lepisto
(74) *Attorney, Agent, or Firm*—Osha • Liang LLP

(57) ABSTRACT

An optical cable module has an optical waveguide formed by surrounding a core with a clad layer and a light-receiving/emitting element, installed on a supporting substrate. A light-releasing face of the optical waveguide or a light-incident face to the optical waveguide is aligned so as to face a light-receiving face or a light-emitting face of the light-receiving/emitting element. The optical waveguide is formed into a film shape having flexibility, and provided with a reinforcing member that prevents a deflection from occurring in the optical waveguide. The optical waveguide is placed on a protruding portion from a supporting face of the optical waveguide on the supporting substrate.

6 Claims, 8 Drawing Sheets

U.S. PATENT DOCUMENTS

| | | | | | |
|---|---|---|---|---|---|
| 5,163,113 | A | * | 11/1992 | Melman | 385/31 |
| 5,390,271 | A | * | 2/1995 | Priest | 385/92 |
| 5,499,312 | A | * | 3/1996 | Hahn et al. | 385/91 |
| 5,999,670 | A | * | 12/1999 | Yoshimura et al. | 385/31 |
| 6,048,107 | A | * | 4/2000 | Pubanz | 385/92 |
| 6,081,638 | A | * | 6/2000 | Zhou | 385/31 |
| 6,205,274 | B1 | * | 3/2001 | Zhou | 385/38 |
| 6,848,839 | B2 | * | 2/2005 | Steinberg | 385/88 |
| 6,904,197 | B2 | * | 6/2005 | Bhagavatula et al. | 385/31 |
| 7,162,127 | B2 | * | 1/2007 | Ohtsu et al. | 385/49 |
| 7,187,828 | B2 | * | 3/2007 | Ohtsu et al. | 385/52 |

FOREIGN PATENT DOCUMENTS

| | | |
|---|---|---|
| JP | 2000-009968 A | 1/2000 |
| JP | 2000-214351 A | 8/2000 |
| JP | 2000-241657 A | 9/2000 |
| JP | 2004-233687 A | 8/2004 |
| JP | 2004-287396 | 10/2004 |
| JP | 2005-62645 A | 3/2005 |
| JP | 2005-321560 A | 11/2005 |
| JP | 2006-39255 A | 2/2006 |

OTHER PUBLICATIONS

Written Opinion from PCT/JP2007/057836 dated Jun. 26, 2007 (8 pages).

Japanese Notification of Reason for Rejection for patent application No. 2008-509900, mailed Sep. 1, 2009, and English translation thereof, 4 pages.

Patent Abstracts of Japan for patent application with Publication No. 2004-287396, Publication Date: Oct. 14, 2004, 1 page.

* cited by examiner

Reinforcing member

PRIOR ART

Shift of sealed face upon filling sealing resin

Shift of sealed face upon filling sealing resin

OPTICAL CABLE MODULE

TECHNICAL FIELD

The present invention relates to an optical cable module used for transmitting optical data, and more particularly concerns an optical cable module having flexibility and a method for manufacturing such an optical cable module.

BACKGROUND ART

In recent years, an optical communication network capable of executing data communication with a large capacity at high speeds has been expanded. It is expected that, from now on, this optical communication network will be installed in consumer appliances. In particular, for applications to transmit data among substrates in an apparatus, there have been strong demands for an optical data transmission cable (optical cable) that can be used without any change from electric cables that have been currently used. From the viewpoint of flexibility, a film optical waveguide is desirably used as this optical cable.

The optical waveguide is formed by a core having a high refractive index and a clad having a low refractive index that is placed on the periphery of the core to be made in contact therewith, and designed to transmit an optical signal that has been made incident on the core, while repeating total reflection on the border between the core and the clad. Here, the film optical waveguide has sufficient flexibility since its core and clad are made from flexible polymer materials.

When such a flexible film optical waveguide is used as an optical cable, it needs to be positioned with a photoelectric conversion element (light-receiving/emitting element) so as to be optically coupled therewith. The light-receiving/emitting element refers to an element that converts an electric signal to an optical signal so as to be transmitted, and receives an optical signal to convert it to an electric signal, and a light-emitting element is used on the light input side, while a light-receiving element is used on the light output side. This positioning process calls for precision since it gives influences to the optical coupling efficiency.

FIG. 16 shows a structural example of an optical cable module in which a film optical waveguide and a light-receiving/emitting element are optically coupled with each other.

An optical cable module 100, shown in FIG. 16, is configured by an optical waveguide 101, a light-receiving/emitting element 102 and a supporting substrate 103 that are placed on an end portion on the light-incident side or the light-releasing side. The optical waveguide 101 is secured onto the supporting substrate 103 near its end portion by bonding or the like so that the relative positional relationship between an end portion of the optical waveguide 101 and the light-receiving/emitting element 102 is in a secured state.

The supporting substrate 103 has a step difference in which the mounting face of the light-receiving/emitting element 102 and the secured face (bonding face) of the optical waveguide 101 form mutually different faces. Here, an end face of the optical waveguide 101 is not perpendicular to the optical axis (center axis in a longitudinal direction of the core), and is cut off diagonally to form an optical path conversion mirror. With this arrangement, a signal light ray, transmitted through the core of the optical waveguide 101, is reflected by the optical path conversion mirror, and changed in its traveling direction to be released toward the light-receiving/emitting element 102.

Patent Documents 1 and 2 have disclosed a structure in which the gap between a light-emitting element and an optical waveguide is filled with a resin having a high refractive index so that the optical waveguide is bonded and secured by this resin. In this structure, the resin layer suppresses an undesired interface reflection so that the optical coupling efficiency can be improved.

Patent Document 1: JP-A No. 2000-214351 (Date of Publication: Aug. 4, 2000).

Patent Document 2: JP-A No. 2000-9968 (Date of Publication: Jan. 14, 2000).

Patent Document 3: JP-A No. 2004-233687 (Date of Publication; Aug. 19, 2004).

DISCLOSURE OF THE INVENTION

In an optical cable module having the structure shown in FIG. 16, however, the tip portion of the optical waveguide 101 protrudes in an optical axis direction from the supporting area of the optical waveguide 101 on the supporting substrate 103. In this case, since the optical waveguide 101 is a film optical waveguide having high flexibility, there is a possibility that, as shown in FIG. 17, a deflection occurs in the tip portion that is not supported by the supporting substrate 103 due to influences such as gravity.

Upon occurrence of such a deflection in the tip portion of the optical waveguide 101, there is a failure to positively hit an optical signal from the light-emitting element 102 to the optical path conversion mirror of the optical waveguide 101 on the light input side, with the result that the optical signal might not be directed to the core of the optical waveguide 101. Moreover, on the light output side, an optical signal to be outputted from the optical waveguide 101 fails to hit the center of the light-receiving element 102, resulting in an optical loss in the optical coupling between the optical waveguide and the light-emitting element. That is, in any of the light input side and light output side, upon occurrence of an excessive deflection in the tip portion of the optical waveguide 101, transmission failure of the optical signal occurs.

Since Patent Documents 1 and 2 have structures in which the gap between the light-receiving element and the optical waveguide is filled with resin, the tip portion of the optical waveguide is secured by the resin so that it is considered that no deflection described above occurs in the optical waveguide. However, the structures of Patent Documents 1 and 2 have a problem in that, due to curing and shrinkage of the resin injected to the gap between the light-emitting element and the optical waveguide, it becomes difficult to carry out a positioning process between the light-receiving/emitting element and the optical waveguide with high precision.

One or more embodiments of the present invention provides an optical cable module that can achieve a stable coupling operation between the optical waveguide and the light-receiving/emitting element.

An optical cable module in accordance with one or more embodiments of the present invention has an optical waveguide formed by surrounding a core with a clad layer and a light-receiving/emitting element, installed on a supporting substrate, and in this structure, the optical waveguide has an optical path conversion mirror that converts a direction of an optical path of an optical signal to be transmitted through the core, a light-releasing face of the optical waveguide or a light-incident face to the optical waveguide is aligned so as to face a light-receiving face or a light-emitting face of the light-receiving/emitting element, and supposing that, on the supporting substrate, an amount of protrusion of waveguide from the end of a supporting face supporting the optical waveguide to the center of the optical path conversion mirror in the core of the optical waveguide is L, that a load of the optical waveguide per unit length is w, that a cross-section secondary moment of the optical waveguide is Iz and that a longitudinal elastic modulus of the optical waveguide is E, the amount of protrusion of waveguide satisfies the following relationship:

$$1.0 \geq (wL^3/6Eiz)\cdot(180/\pi).$$

Here, the light-receiving/emitting element refers to an element that serves as a light-emitting element on the light incident side to the optical waveguide, and also serves as a light-receiving element on the light releasing side from the optical waveguide.

An angle, made by the light-releasing face (or light-incident face) on the tip of the optical waveguide and the light-releasing face (or light-incident face) of the optical waveguide in a state where there is no deflection (hanging down) in the optical waveguide, is defined as a hanging-down angle θ of the tip of the waveguide, the following relationship is satisfied:

$$\theta = (wL^3/6Eiz)\cdot(180/\pi)$$

Here, the load w per unit length of the waveguide is found by (mass per unit length of the waveguide)×(gravitational acceleration+maximum value of actual applicable acceleration), and the permissible angle θmax of the hanging-down angle θ of the tip of the waveguide is about 1.0°. Therefore, in the optical cable module, by limiting the amount of protrusion of waveguide L to a value that satisfies the following inequality, the hanging-down angle θ of the tip of the waveguide can be suppressed within 1.0°, which is a permissible angle, so that the amount of deflection occurring in the optical waveguide can be limited to a degree that causes no transmission failure of the optical signal.

$$1.0 > (wL^3/6Eiz)\cdot(180/\pi)$$

An optical cable module in accordance with one or more embodiments of the present invention has an optical waveguide formed by surrounding a core with a clad layer and a light-receiving/emitting element, installed on a supporting substrate, and in this structure, a light-releasing face of the optical waveguide or a light-incident face to the optical waveguide is aligned so as to face a light-receiving face or a light-emitting face of the light-receiving/emitting element, and the optical waveguide is provided with a reinforcing member that is placed on a face of the optical waveguide on the side having the light input/output face and/or the side having no light input/output face, at a protruding portion from a supporting face of the optical waveguide on the supporting substrate.

In accordance with the above-mentioned structure, since the reinforcing member is placed on the upper face (face on the side having no light input/output face) or the lower face (face on the side having a light input/output face) of the optical waveguide, the occurrence of a deflection in the optical waveguide is suppressed, and the amount of deflection occurring in the optical waveguide can be limited to such a degree as not to cause any transmission failure.

An optical cable module in accordance with one or more embodiments of the present invention has an optical waveguide formed by surrounding a core with a clad layer and a light-receiving/emitting element, installed on a supporting substrate, and in this structure, the optical waveguide is provided with an optical path conversion mirror that converts a direction of an optical path of an optical signal to be transmitted through the core, a light-releasing face of the optical waveguide or a light-incident face to the optical waveguide is aligned so as to face a light-receiving face or a light-emitting face of the light-receiving/emitting element, and the light-receiving/emitting element is sealed with a sealing resin, with a void being formed between a surface of the sealing resin on a light-receiving face or a light-emitting face of the light-receiving/emitting element and a light-releasing face or a light-incident face of the optical waveguide, and supposing that, on the supporting substrate, an amount of protrusion of waveguide from the end of a supporting face supporting the optical waveguide to the center of the optical path conversion mirror in the core is L, and that a width in the optical axis direction of the optical waveguide of a fillet generated in the sealing resin is F, the following relationship is satisfied:

$$L \geq F$$

Here, the fillet, discussed here, refers to a portion where the applied sealing resin prior to curing is raised by a surface tension on an interface (interface perpendicular to the optical axis of the optical waveguide) relative to the supporting substrate, with the result that the surface has a cured portion that fails to form a surface in parallel with the light-receiving/emitting face of the light-receiving/emitting element. Moreover, the fillet width F of the sealing resin is defined as a width in the optical axis direction of the optical waveguide of an area in which an angle, made by the surface of the sealing resin and the light-receiving/emitting face of the light-receiving/emitting element, is set to 5° or more.

In accordance with the above-mentioned arrangement, it becomes possible to avoid a problem in which the fillet extends onto the area on the light-receiving/emitting face of the light-receiving/emitting element to give adverse effects (degradation of transmission efficiency or the like) to the transmission of an optical signal.

BRIEF DESCRIPTIONS OF THE DRAWINGS

FIG. 1, which relates to an embodiment of the present invention, is a cross-sectional view that shows a hanging-down state of an optical waveguide that occurs in an optical cable module.

FIG. 2 is a cross-sectional view that shows an essential structure of the optical cable module.

FIG. 3, which relates to another embodiment of the present invention, is a cross-sectional view that shows an essential structure of the optical cable module.

FIG. 4, which relates to still another embodiment of the present invention, is a cross-sectional view that shows an essential structure of the optical cable module.

FIG. 5, which relates to still another embodiment of the present invention, is a cross-sectional view that shows an example of an attached example of a reinforcing member to an optical waveguide.

FIG. 6, which relates to still another embodiment of the present invention, is a cross-sectional view that shows an essential structure of the optical cable module.

FIG. 7, which relates to still another embodiment of the present invention, is a cross-sectional view that shows an essential structure of the optical cable module.

FIG. 8, which relates to still another embodiment of the present invention, is a cross-sectional view that shows an essential structure of the optical cable module.

FIG. 9 is a view that shows a state in which a sealing resin extends onto a supporting face of an optical waveguide in the optical cable module.

FIG. 10, which relates to still another embodiment of the present invention, is a cross-sectional view that shows an essential structure of the optical cable module.

FIG. 11, which relates to still another embodiment of the present invention, is a cross-sectional view that shows an essential structure of the optical cable module.

FIG. 12, which relates to still another embodiment of the present invention, is a cross-sectional view that shows an essential structure of the optical cable module.

FIG. 13, which relates to still another embodiment of the present invention, is a cross-sectional view that shows an essential structure of the optical cable module.

FIG. 14, which relates to the other embodiment of the present invention, is a cross-sectional view that shows an essential structure of the optical cable module.

FIG. 20($b$) is a cross-sectional view that shows the other structural example of an optical cable module in which an optical waveguide is assembled on a sealed light-receiving/emitting element.

BEST MODE FOR CARRYING OUT THE INVENTION

Referring to Figures, the following description will discuss one embodiment of the present invention. First, referring to FIG. 2, one structural example of an optical cable module relating to the present embodiment is explained.

Figure 2:
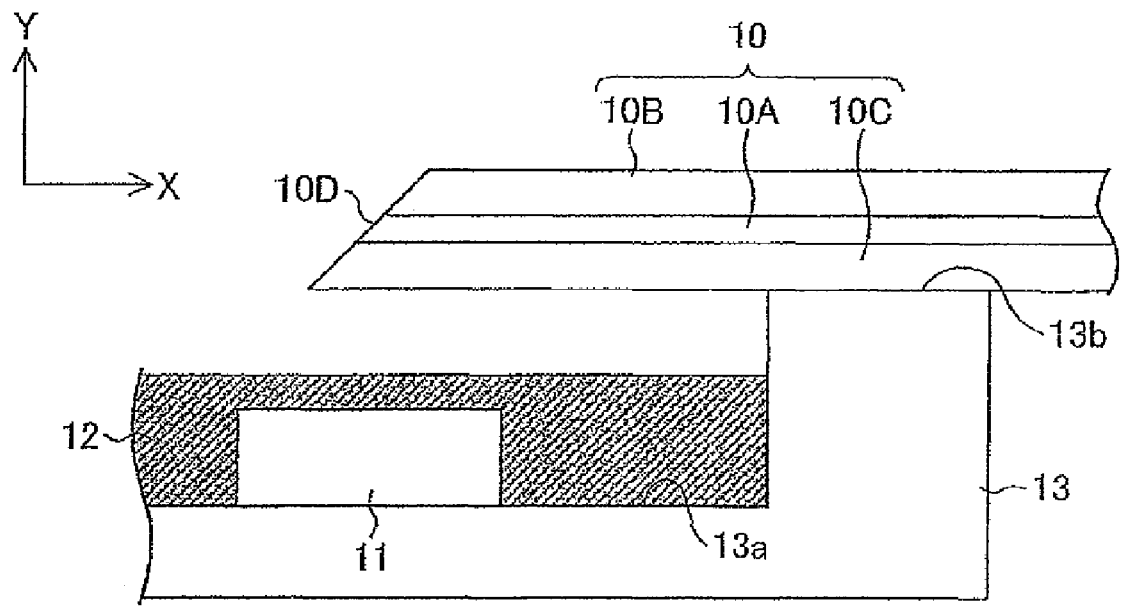

An optical cable module 1 shown in FIG. 2 is mainly configured by an optical waveguide 10, a light-receiving/emitting element 11, a sealing resin 12 and a supporting substrate 13 that are placed near its end portion. An end portion of the optical waveguide 10 is secured onto the supporting substrate 13 by bonding or the like, and the end portion of the optical waveguide 10 and the light-receiving/emitting element 11 are fixed in the relative positional relationship thereof. Moreover, the optical cable module 1 may be provided with an electric wire and an electrical connection unit so as to easily take out an electric signal outputted by the light-receiving/emitting element 11. Here, the light-receiving/emitting element 11 forms a light-emitting element such as a laser diode at the end portion of the light incident side to the optical waveguide 10, and also forms a light-receiving element such as a photodiode at the end portion of the light releasing side from the optical waveguide 10.

First, the optical waveguide 10 is configured by a core 10A, an upper clad layer 10B and a lower clad layer 10C. That is, the optical waveguide 10 has a laminated structure in which the core 10A is sandwiched by the upper clad layer 10B and the lower clad layer 10C. A light signal to be transmitted by the optical waveguide 10 is allowed to travel in the core 10A, while being reflected by the interface between the core 10A and the upper clad layer 10B or by the interface between the core 10A and the lower clad layer 10C. Here, in FIG. 2, in the neighborhood of the end portion of the optical waveguide 10, a longitudinal direction (light axis direction) of the optical waveguide 10 is defined as an X-axis direction, and a lamination direction of the core 10A, the upper clad layer 10B and the lower clad layer 10C is defined as a Y-axis direction. Here, this Y-axis direction is also coincident with a normal direction of the mounting face of the light-receiving/emitting element 11 on the supporting substrate 13.

An end face of the optical waveguide 10 is not made perpendicular to the optical axis (X-axis), and is diagonally cut off to form an optical path conversion mirror 10D. More specifically, the end face of the optical waveguide 10 is made perpendicular to the XY plane, and tilted so as to make an angle $\theta(\theta<90°)$ relative to the X-axis.

Thus, on the light-releasing side of the optical waveguide 10, a signal light ray, transmitted through the core 10A, is reflected by the optical path conversion mirror 10D, and changed in its traveling direction to be released toward the light-receiving element 11 from the light-releasing face of the optical path conversion mirror 10D. On the light incident side of the optical waveguide 10, a signal, which has been released from the light-emitting element 11 and made incident on the incident face of the optical path conversion mirror 10D, is reflected by the optical path conversion mirror 10D, and changed in its traveling direction to be transmitted to the core 10A. Here, the light-releasing face (or light-incident face) of the optical waveguide 10 is located on the outer surface of the lower clad layer 10C (or may be that of the upper clad layer 10B) since the optical path conversion mirror 10D is installed, and the light-receiving face (or light-emitting face) of the light-receiving/emitting element 11 is aligned so as to face the light-releasing face (or light-incident face) of the optical waveguide 10.

Here, the tilt angle $\theta$ of the optical path conversion mirror 10D is normally set to 45° so that the positioning process between the optical path conversion mirror 10D and the light-receiving/emitting element 11 is easily carried out. In the present invention, however, the tilt angle $\theta$ of the optical path conversion mirror 10D is not particularly limited to 45°, and in a case where the tilt angle $\theta$ of the optical path conversion mirror 10D is made smaller than 45°, the light-receiving/emitting element 11 can be easily disposed at an area that is free from the generation of fillet of the sealing resin 12 so that a preferable structure is achieved. More specifically, the tilt angle $\theta$ of the optical path conversion mirror 10D is preferably set in a range from 35° to 50°. Here, the optical path conversion mirror may be designed so that a mirror unit is externally attached to the end portion of the optical waveguide 10.

One of the functions of the sealing resin 12 is to protect the light-receiving/emitting element 11 from dusts and moisture by sealing the light-receiving/emitting element 11 and consequently to enhance the reliability of the optical cable module 1. In addition, the sealing resin 12 also has functions for preventing an optical signal transmitted between the optical waveguide 10 and the light-receiving/emitting element 11 from being diffused so that optical loss due to the diffusion of the optical signal is suppressed. Preferable examples of the material for the sealing resin 12 include transparent resins having a high refractive index, such as epoxy-based, acryl-based, silicone-based and urethane-based resins. Moreover, those materials for the sealing resin 12 that have a refractive index higher than that of air are more effectively used.

Here, in the structure shown in FIG. 2, the entire gap between the optical waveguide 10 and the light-receiving/emitting element 11 is not filled with the sealing resin 12, and a void is formed between the sealing resin 12 and the optical waveguide 10. That is, the void is formed between the surface of the sealing resin 12 on the light-receiving face or the light-emitting face of the light-receiving/emitting element 11 and the light-releasing face or the light-incident face of the optical waveguide 10. This structure is prepared because, when the optical waveguide 10 is made in contact with the sealing resin 12, the curing shrinkage of the sealing resin 12 gives adverse effects to the positioning process of the optical waveguide 10.

The sequence of manufacturing processes of the optical cable module 1 having the structure shown in FIG. 2 is explained as follows: First, the light-receiving/emitting element 11 is mounted on a surface 13a of a supporting substrate 13, and after applying a sealing resin 12 thereon with a predetermined thickness, the sealing resin is cured. Thereafter, an optical waveguide 10 is bonded onto a surface 13b of the supporting substrate 13, and secured thereon.

In the optical cable module 1 of the above-mentioned structure, the opposing face of the optical waveguide 10 to the light-receiving/emitting element 11 is designed so as not to be made in contact with the sealing resin 12, the curing shrinkage of the sealing resin 12 gives no adverse effects to the optical waveguide 10. Therefore, upon bonding and securing the optical waveguide 10 onto the supporting substrate 13, it is possible to achieve high positional precision.

In the optical cable module 1 relating to the present embodiment, the amount of protrusion of the optical waveguide 10 is regulated in the following manner so as to prevent occurrence of transmission degradation in an optical signal due to deflection of the optical waveguide 10.

Figure 1:
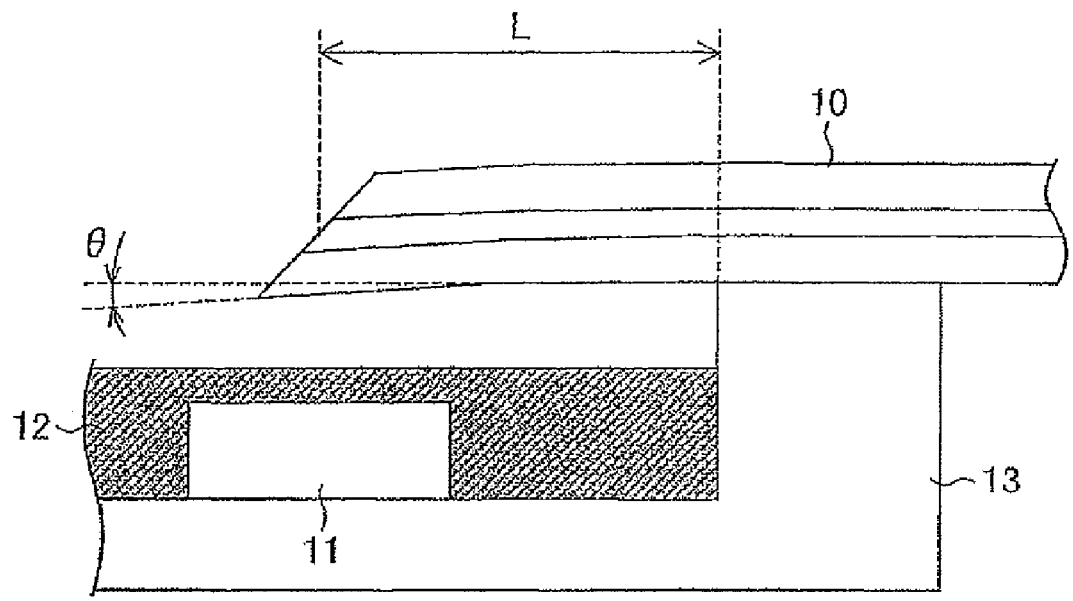

First, as shown in FIG. 1, suppose that the amount of protrusion of waveguide is L(m), that the hanging-down angle of the tip of the waveguide is θ(°), that the load of the waveguide per unit length is w(N/m), that the cross-section secondary moment of the waveguide is Iz($m^4$) and that the longitudinal elastic modulus of the waveguide is E(Pa). Here, the amount of protrusion of waveguide L is defined as the length from the end of the supporting face 13b supporting the optical waveguide 10 to the center of the optical path conversion mirror 10D in the core 10A. The hanging-down angle θ of the tip of the waveguide is defined as an angle made by the light-releasing face (or light-incident face) on the tip of the optical waveguide 10 and the light-releasing face (or light-incident face) of the optical waveguide 10 in a state where there is no deflection (hanging down) in the optical waveguide 10. Moreover, the load w per unit length of the waveguide is found by (mass per unit length of the waveguide)×(gravitational acceleration+maximum value of actual applicable acceleration).

In this case, the hanging-down angle θ(°) of the tip of the waveguide is given by the following equation (1):

$$\theta = (wL^3/6Eiz) \cdot (180/\pi) \qquad (1)$$

Here, the permissible angle θmax of the hanging-down angle θ of the tip of the waveguide is about 1.0°. Therefore, in the optical cable module 1, the amount of protrusion of waveguide L is limited to a value that satisfies the following inequality:

$$1.0 > (wL^3/6Eiz) \cdot (180/\pi)$$

More specifically, the amount of protrusion of waveguide L is regulated to a range of 400 μm or less. Here, a value of 20 m/$s^2$ is used as the maximum value of actual applicable acceleration.

In this manner, in the optical cable module 1 relating to the present embodiment, by regulating the amount of protrusion of the optical waveguide 10, the amount of deflection that occurs in the optical waveguide 10 can be limited to such a degree as not to cause a transmission failure of an optical signal. Thus, the optical waveguide and the light-receiving/emitting element can be coupled to each other in a stable manner.

Moreover, in the optical cable module 1 explained above, by regulating the amount of protrusion of the optical waveguide 10, the amount of deflection occurring in the optical waveguide 10 is limited; however, in addition to this structure, other structures can be proposed so as to reduce the deflection that occurs in the optical waveguide 10. The following description will discuss other structural examples used for reducing the deflection that occurs in the optical waveguide 10.

Figure 3:
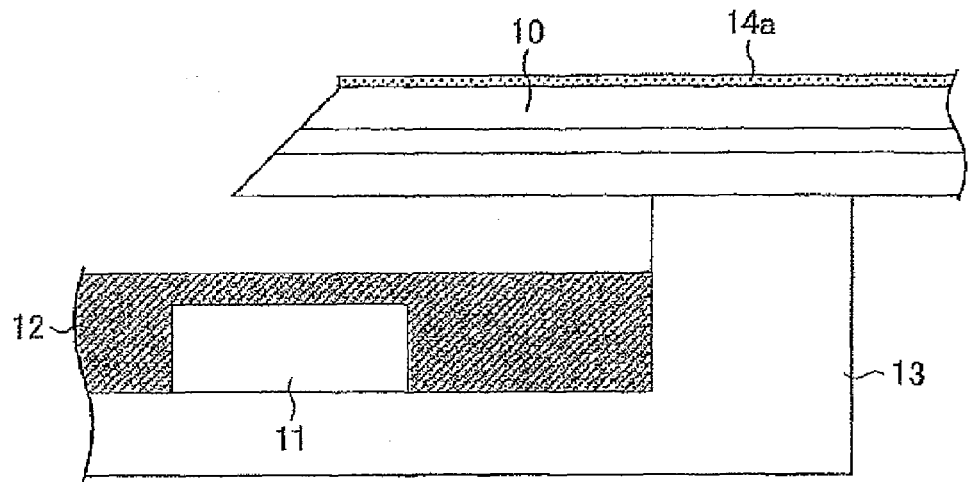

FIG. 3 shows a structure in which by placing a reinforcing member 14a on the upper face (face on the side having no light input/output face) of an optical waveguide 10, the occurrence of deflection in the optical waveguide 10 is suppressed. The reinforcing member 14a may be formed by affixing a plate-shaped reinforcing member onto the optical waveguide 10, or may be formed by applying a highly curable resin to the optical waveguide 10 to be cured thereon. Here, upon applying a highly curable resin to be cured thereon, the resin may be cured while being maintained in the optical waveguide 10, with no deflection occurring therein.

Figure 4:
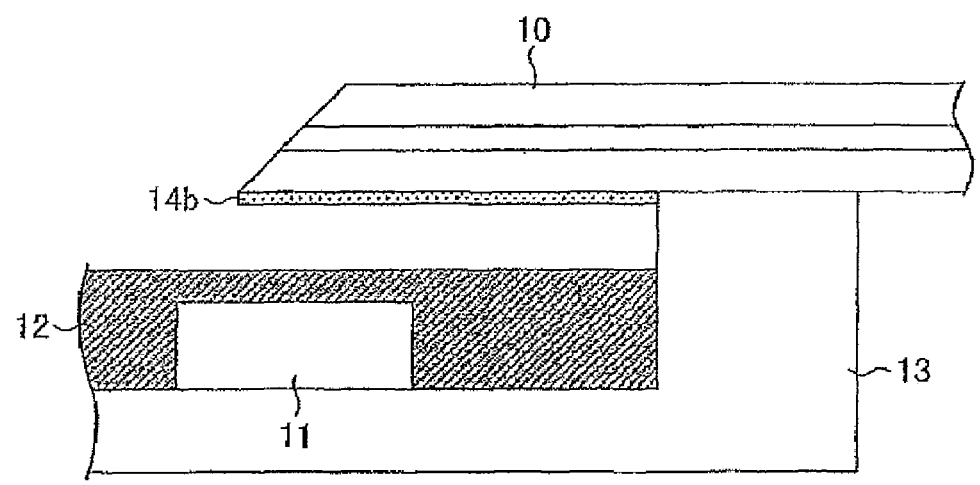

Moreover, FIG. 4 shows a structure in which by placing a reinforcing member 14b on the lower face (face on the side having a light input/output face) of an optical waveguide 10, the occurrence of deflection in the optical waveguide 10 is suppressed. The reinforcing member 14b is prepared as a member having a light-transmitting property, and in the same manner as in the reinforcing member 14a, it may be formed by affixing a plate-shaped reinforcing member onto the optical waveguide 10, or may be formed by applying a highly curable resin to the optical waveguide 10 to be cured thereon.

Figure 5:
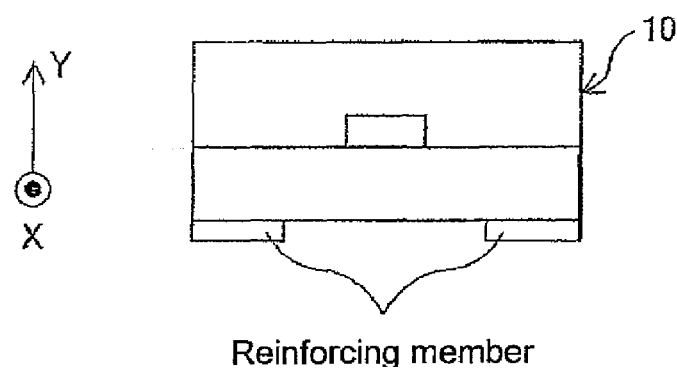

Here, although not shown in Figures, in the optical cable module 1, the reinforcing member may be formed on a side face of the optical waveguide 10, or may be formed on a plurality of desired faces (for example, both of the reinforcing member 14a on the upper face of the optical waveguide 10 and the reinforcing member 14b on the lower face of the optical waveguide 10 may be prepared). Here, the reinforcing member is not necessarily required to be disposed over the entire attaching face of the optical waveguide 10. For example, it may be formed on each of the two attaching faces (see FIG. 5) of the optical waveguide 10, or may be attached to the tip portion of the attaching face thereof.

Moreover, in the optical cable module 1 explained above, the light-receiving/emitting element 11 is sealed with a sealing resin 12; however, a fillet is normally generated in this sealing resin 12. Here, the fillet, discussed here, refers to a portion where the applied sealing resin 12 prior to curing is raised by a surface tension on an interface (interface perpendicular to the X-axis) relative to the supporting substrate 13, and the resulting surface forms a cured portion that is not in parallel with the light-receiving/emitting face of the light-receiving/emitting element.

Figure 6:
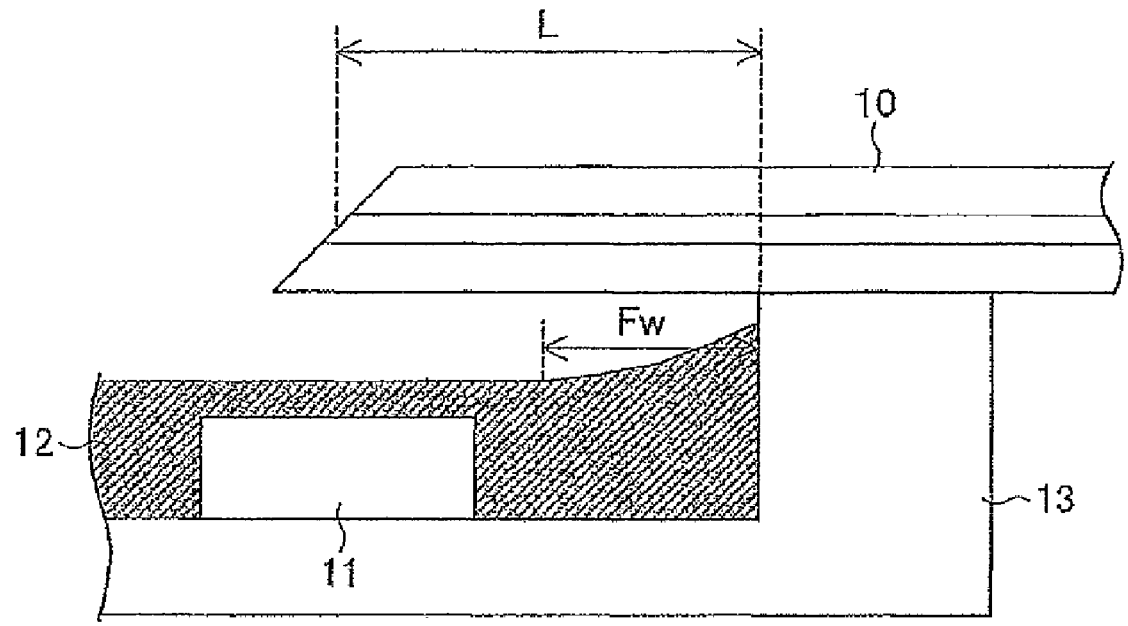

In the optical cable module 1, in a case where, as shown in FIG. 6, the fillet extends onto the area on the light-receiving/emitting face of the light-receiving/emitting element 11, adverse effects (degradation of transmission efficiency or the like) might be given to the transmission of an optical signal. In order to also avoid such a problem, the amount of protrusion of the optical waveguide 10 is preferably regulated.

In FIG. 6, suppose that the fillet width of the sealing resin is F. Here, the fillet width F of the sealing resin refers to the width in the X-axis direction of an area in which the angle, made by the surface of the sealing resin 12 and the light-receiving/emitting face of the light-receiving/emitting element 11, is set to 5° or more. Moreover, in the optical cable module 1, the amount of protrusion L of the waveguide is set to a size that is the fillet width F of the sealing resin or more. That is, the following inequality is satisfied:

$$L \geq F$$

Although the size of the amount of generation of the fillet width F of the sealing resin defers depending on materials for the sealing resin 12, the amount of protrusion L of waveguide may be preferably regulated to 100 μm or more, more preferably, to 130 μm or more.

Figure 7:
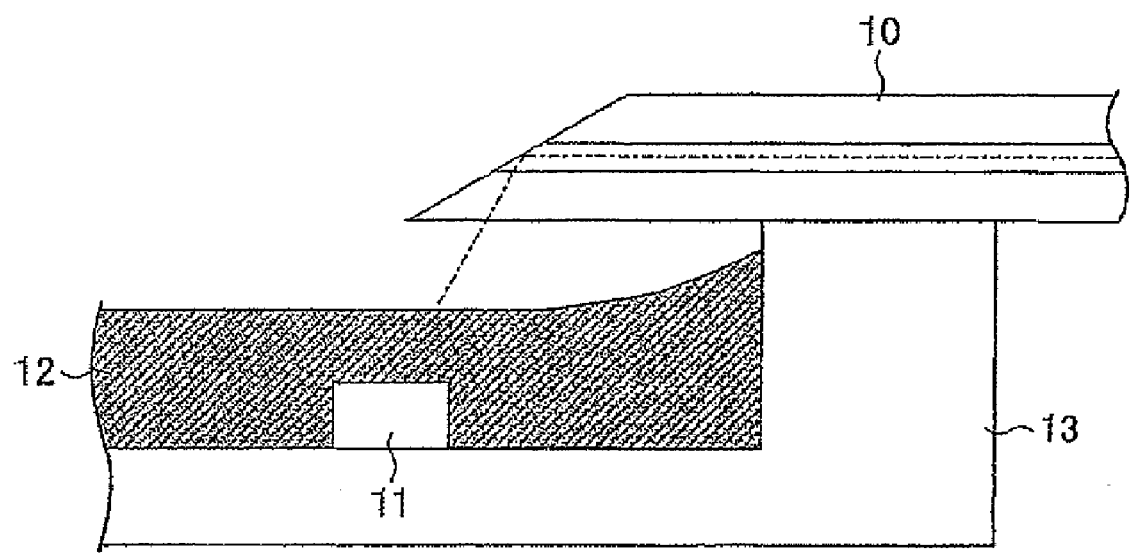

Moreover, as the method for reducing the amount of protrusion L of the waveguide of the optical waveguide 10 so as to hardly cause the deflection and for also reducing the adverse effects by the fillet, a structure is proposed in which the tilt angle θ of the optical path conversion mirror 10D is made smaller than 45°. That is, by making the tilt angle θ of the optical path conversion mirror 10D smaller, the light-receiving/emitting element 11 can be disposed at an area that is free from a fillet of the sealing resin 12 as shown by a dashed line in FIG. 7, and even when the amount of protrusion of the optical waveguide 10 is small (in a state where the optical path conversion mirror 10D to be formed at the tip of the optical waveguide 10 is not located right above the light-receiving/emitting element 11), the optical coupling between the optical waveguide 10 and the light-receiving/emitting element 11 can be obtained. Here, the above-mentioned effects can be obtained as long as the tilt angle θ of the optical path conversion mirror 10D is smaller than 45°; however, the tilt angle is more preferably set in a range from 35° or more to 45° or less.

Figure 8:
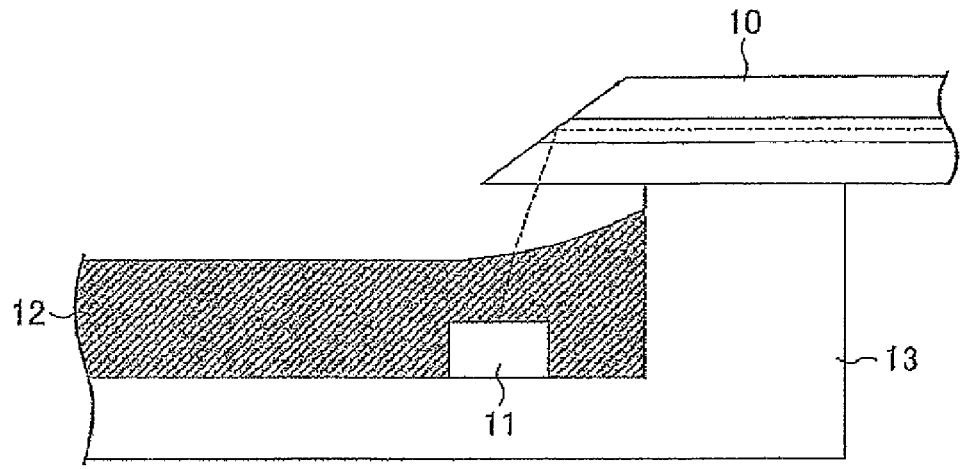

Moreover, as a modified example of the structure in which the tilt angle θ of the optical path conversion mirror 10D is made smaller, another structure may be proposed in which, as shown in FIG. 8, the light-receiving/emitting element 11 is disposed on the generation area of a fillet on the surface of the sealing resin 12, and upon optically coupling the optical waveguide 10 and the light-receiving/emitting element 11, refraction by the angle of the fillet surface is utilized. In this structure, since the light-receiving/emitting element 11 can be disposed at a position closer to the supporting face side of the optical waveguide 10 on the supporting substrate 13 so that the amount of protrusion L of the waveguide of the optical waveguide 10 is made further smaller.

Figure 9:
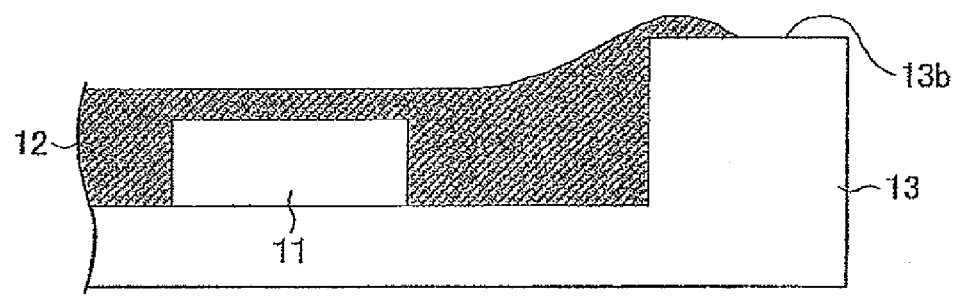

Moreover, since the sealing resin 12 is formed so as to provide a void between the sealing resin 12 and the optical waveguide 10, the optical cable module 1 has a structure in which, after curing the sealing resin 12, the optical waveguide 10 is secured onto the supporting substrate 13. At this time, as shown in FIG. 9, the sealing resin 12 might extend onto the supporting face 13b for the optical waveguide 10 of the supporting substrate 13.

In a case where the optical waveguide 10 is bonded and secured to the supporting substrate 13, with the sealing resin 12 extending onto the supporting surface 13b for the optical waveguide 10 in this manner, it is clear that the positioning process of the optical waveguide 10 is not carried out accurately. For this reason, it is necessary to prevent the sealing resin 12 from extending onto the supporting face 13b for the optical waveguide 10 of the supporting substrate 13. The following description will discuss various structures and methods for preventing the sealing resin 12 from extending onto the supporting face 13b for the optical waveguide 10 on the supporting substrate 13.

Figure 10:
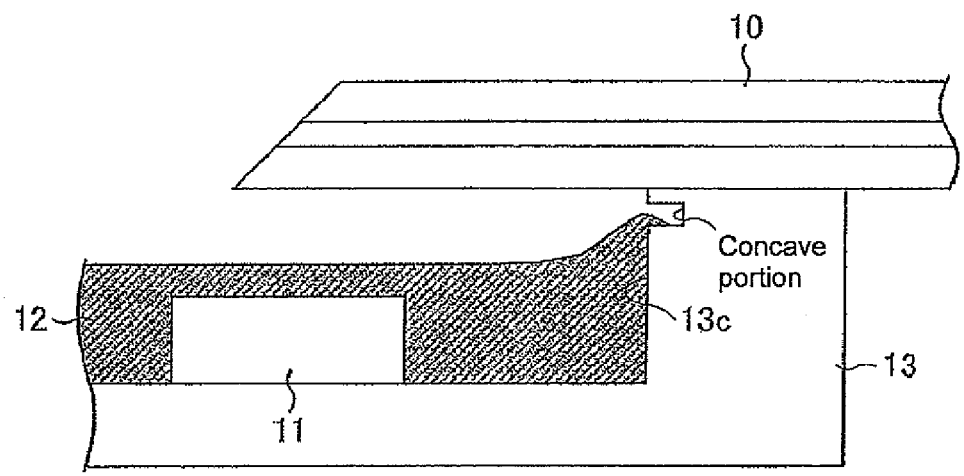
Figure 11:
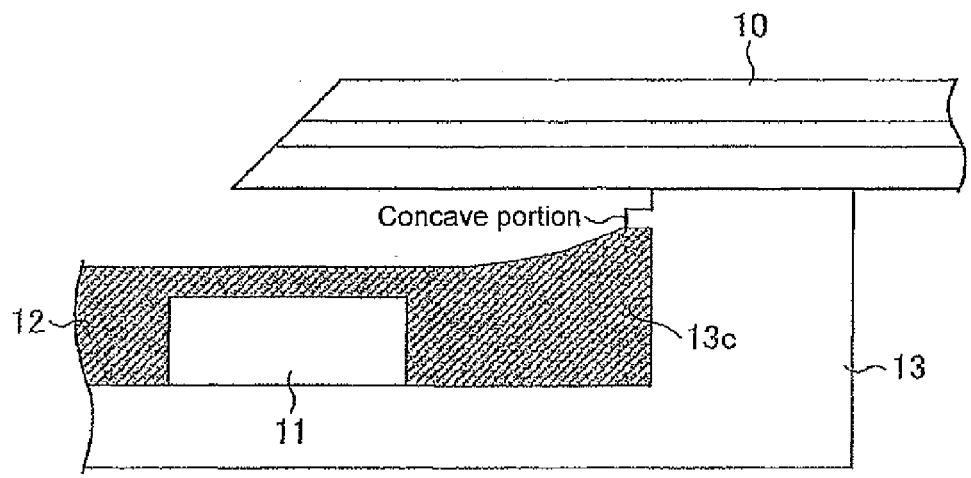
Figure 12:
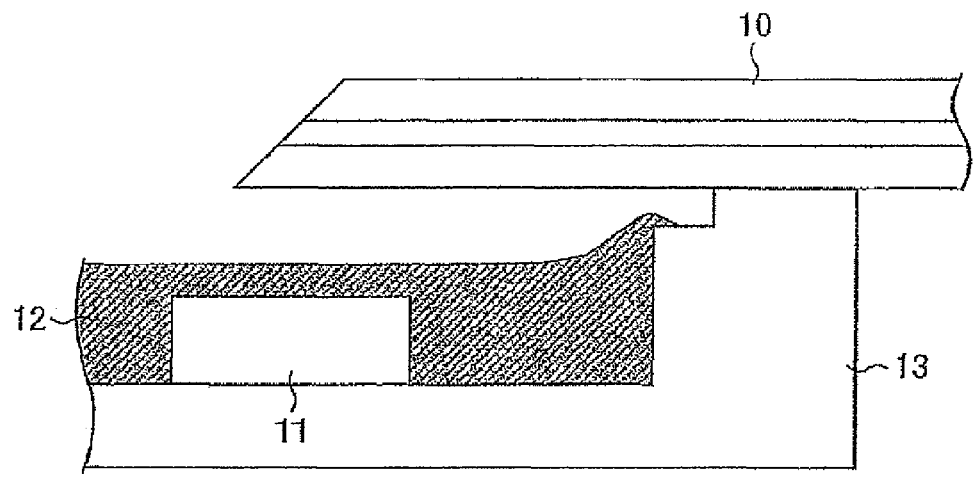
Figure 13:
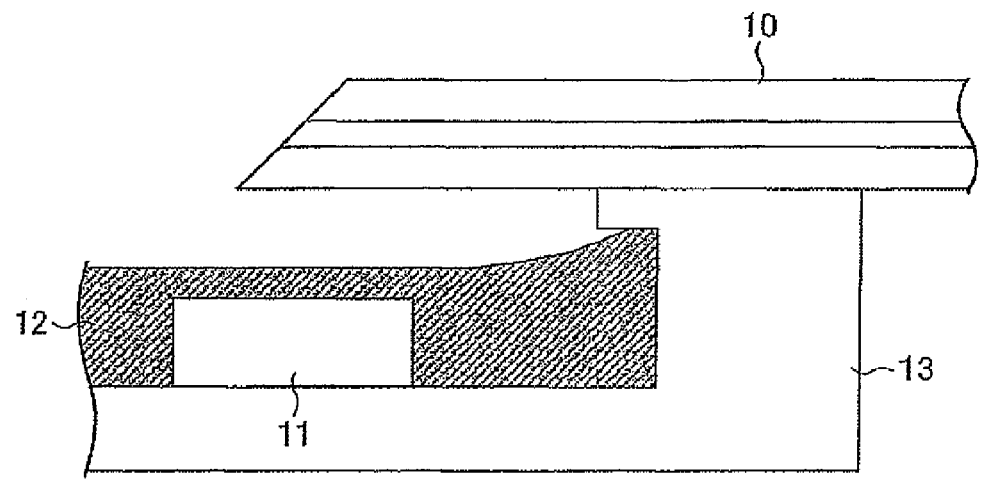

As the first method, a structure is proposed in which, as shown in FIGS. 10 and 11, a concave portion or a convex portion is formed on the contact face 13c (face perpendicular to the X-axis) with the sealing resin 12 of the supporting substrate 13. That is, the reason that the sealing resin 12 extends onto the surface 13b of the supporting substrate 13 is because the sealing resin 12 expands along the surface 13c by its surface tension; therefore, by forming the concave portion or the convex portion on the surface 13c, it becomes possible to prevent the sealing resin 12 from extending onto the surface 13b. Here, in place of forming the concave portion or the convex portion, by forming a step difference on the surface 13c, as shown in FIGS. 12 and 13, the same effects can be obtained.

Figure 14:
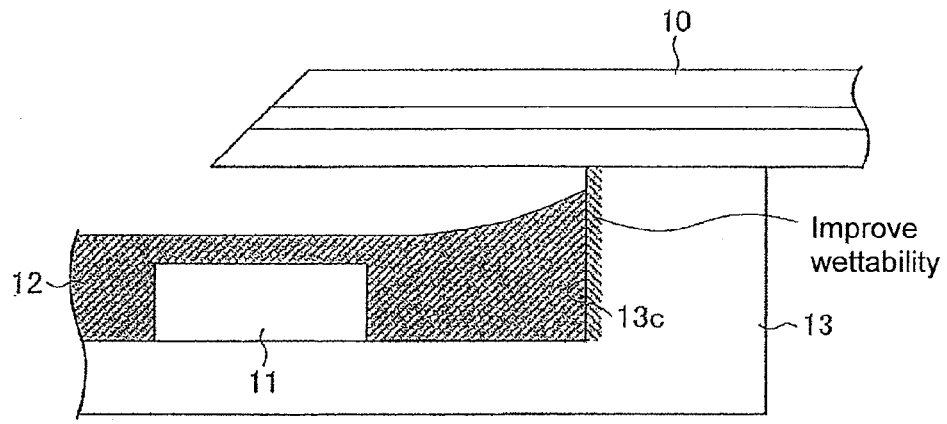

As the second method, a structure is proposed in which, as shown in FIG. 14, the wettability of the contact face 13c with the sealing resin 12 of the supporting substrate 13 is improved. That is, as the wettability of the contact face 13c becomes lower, the sealing resin 12 expands along the face 13c more easily. By improving the wettability of the contact face 13c, it becomes possible to prevent the sealing resin 12 from expanding along the face 13c to extend onto the face 13b. The methods for improving the wettability of the face 13c of the supporting substrate 13 include;

(1) a method in which, by subjecting the face 13c to a treatment, such as a UV washing, corona discharging and plasma treatment, the wettability of the surface (interface activating treatment) is improved, (2) a method in which a material for improving the wettability (so-called plasma material) is applied to the face 13c, and (3) a method in which a member having a higher wettability than that of the supporting substrate 13 (glass, metal or the like) is affixed onto the face 13c.

Figure 15:
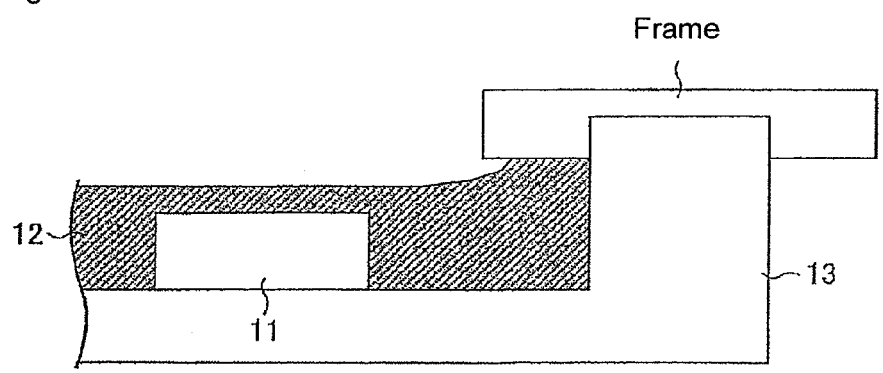
FIG. 15 is a view that shows a state of a sealing resin at the time of curing in the optical cable module.
Figure 16:
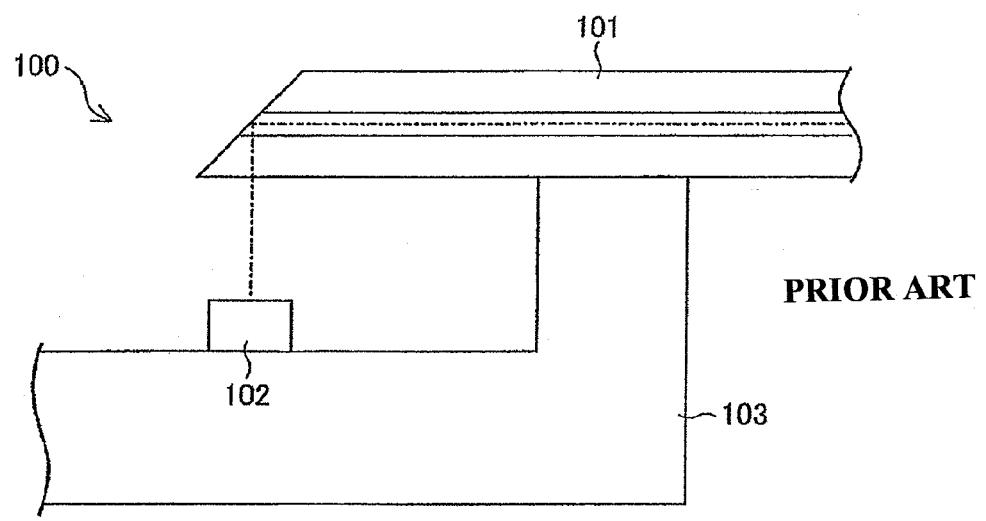
FIG. 16 is a cross-sectional view that shows an essential structure of a conventional optical cable module.
Figure 17:
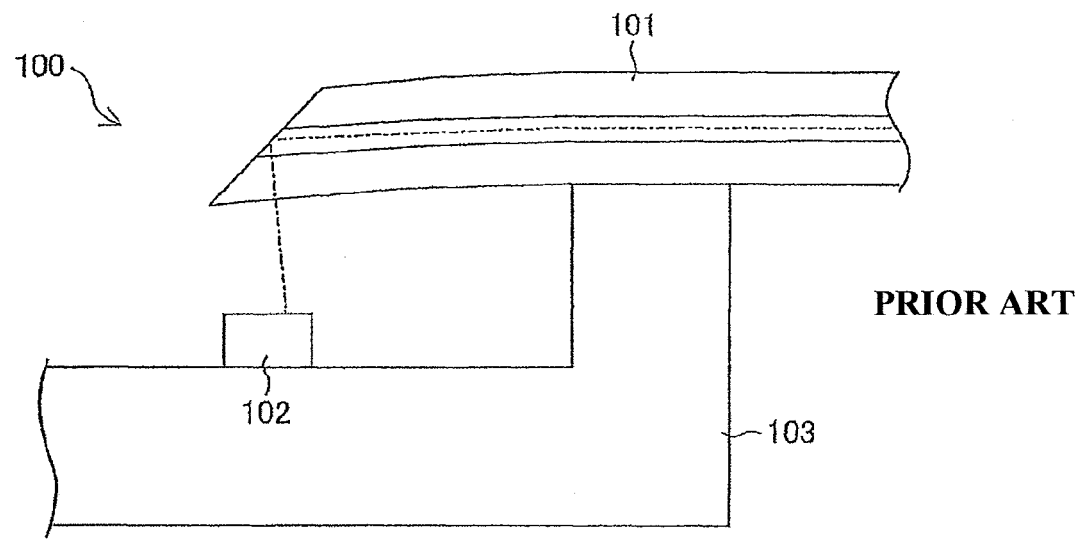
FIG. 17 is a cross-sectional view that shows a hanging-down state of an optical waveguide in the conventional optical cable module.

As the third method, a method is proposed in which, as shown in FIG. 15, upon curing the sealing resin 12, a frame is placed on the surface thereof so as to prevent the sealing resin 12 from expanding along the face 13c.

Figure 18:
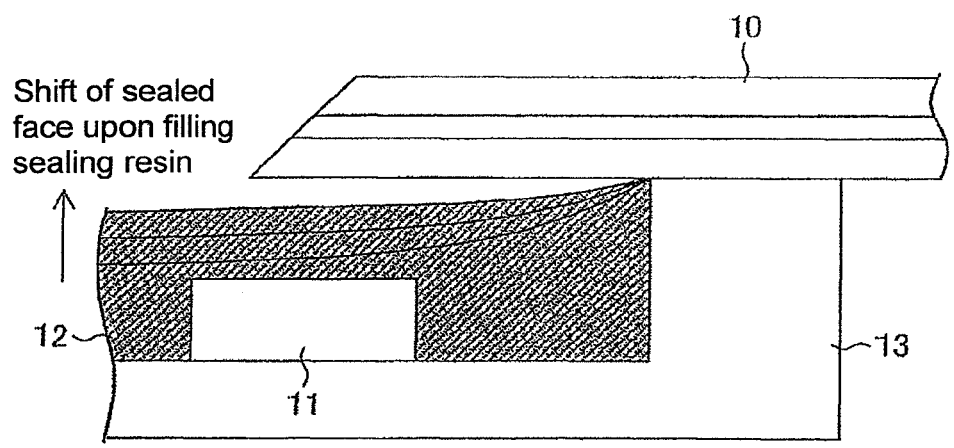
FIG. 18 is a cross-sectional view that shows a structural example of an optical cable module in which an optical waveguide is assembled on a sealed light-receiving/emitting element.

Normally, upon packaging the optical waveguide 10 on the sealed light-receiving/emitting element 11, a structure as shown in FIG. 18 is proposed. In this structure, however, the sealing resin 12 causes a fillet on the inner wall of the supporting substrate 13, resulting in a problem of failing to form a flat sealing face.

Moreover, in a case where, after packaging the optical waveguide 10, the sealing process is carried out thereon, this fillet tends to further extend down to the lower face of the optical waveguide 10. In a case where, in order to avoid this problem, after the sealing process of the light-receiving/emitting element 11, the optical waveguide 10 is packaged thereon, the sealing resin 12 seeps out onto fine irregularities formed on the upper face of the supporting substrate 13 at the time of molding, resulting in degradation of the adhesive property between the optical waveguide 10 and the supporting substrate 13. In particular, in a case where a silicone-based resin is used as the sealing resin 12, since the silicone-based resin has high wettability, the above-mentioned problems occur conspicuously.

In order to solve these problems, for example, a method is proposed in which, by increasing the amount of protrusion of the optical waveguide 10 so as to execute an optical coupling process on a flat position on the sealing face, or a method is proposed in which, by lowering the sealing face so as to prevent the resin from seeping out onto the upper face of the supporting substrate 13. However, the former method causes a problem of a mechanical instability in the tip of the optical waveguide 10, and the latter method causes a reduction in the optical coupling efficiency.

Figure 19:
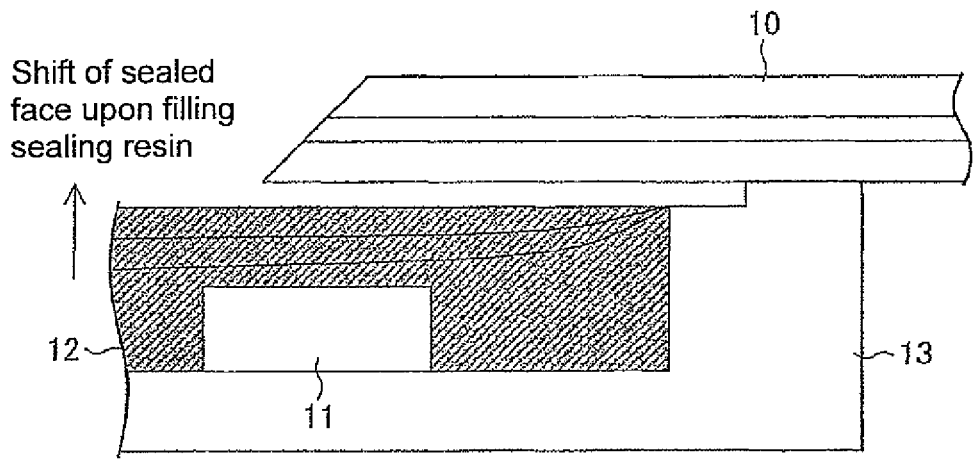
FIG. 19 is a cross-sectional view that shows another structural example of an optical cable module in which an optical waveguide is assembled on a sealed light-receiving/emitting element.

In the present embodiment, as shown in FIG. 19, by forming a step difference in a horizontal direction on the inner wall of the supporting substrate 13, the above-mentioned problems can be solved all at once. That is, by forming the step difference on the inner wall of the supporting substrate 13, the sealing face of the sealing resin 12 can be flattened at a position corresponding to the step difference so that, without the necessity of increasing the amount of protrusion of the optical waveguide 10, the tip of the optical waveguide 10 is optically coupled, with an amount of mechanically stable protrusion, and is also optically coupled on a flat sealing face with a small air gap. Moreover, it is possible to prevent the sealing resin 12 from seeping out onto the upper face (packaging face of the optical waveguide 10) of the supporting substrate 13.

Figure 20A:
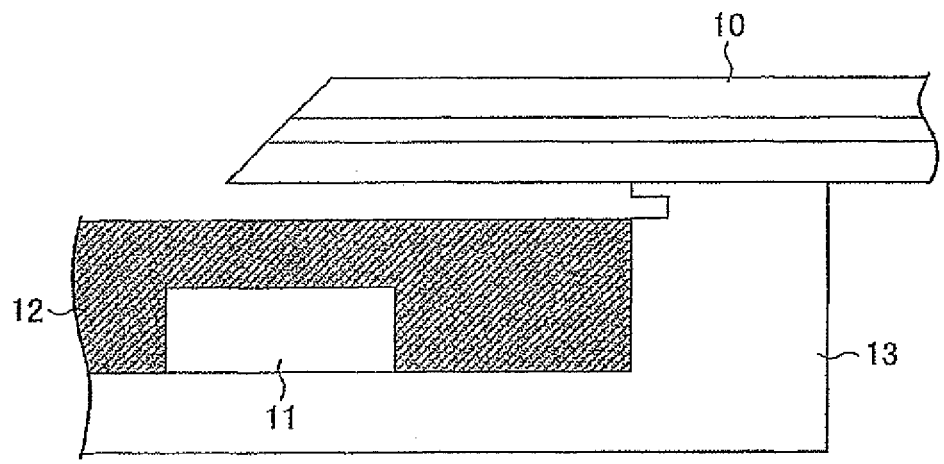
FIG. 20($a$) is a cross-sectional view that shows still another structural example of an optical cable module in which an optical waveguide is assembled on a sealed light-receiving/emitting element.
Figure 20B:
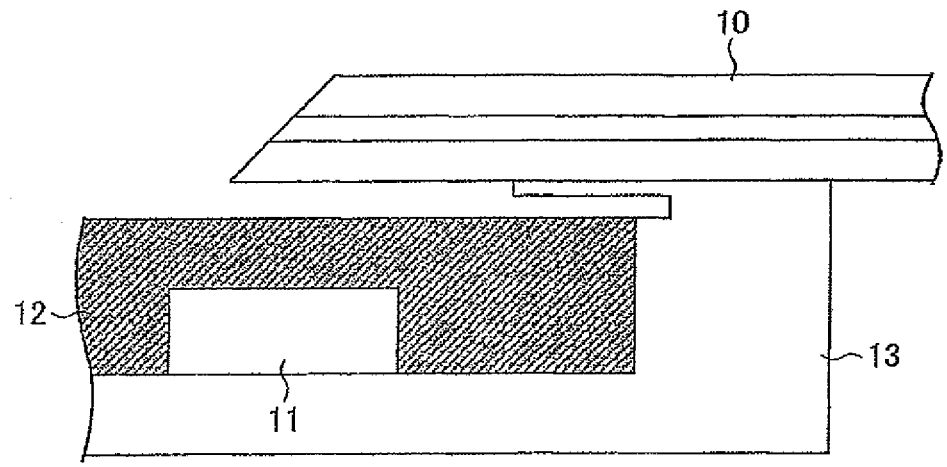

Moreover, as shown in FIGS. 20(*a*) and 20(*b*), a structure may be used in which a step difference face of at least one concave portion is formed on the inner wall of the supporting substrate 13 in a horizontal direction. In this structure also, in the same manner as in the structure in which a step difference is formed on the inner wall of the supporting substrate 13, it is possible to prevent the sealing resin 12 from forming a fillet on the inner wall of the supporting substrate 13 and also to prevent the sealing resin 12 from seeping out onto the upper face (packaging face of the optical waveguide 10) of the supporting substrate 13. Moreover, in comparison with the structure of FIG. 19 with a step difference formed therein, this structure makes it possible to reduce the amount of protrusion of the optical waveguide 10 (the length of a portion that is not secured onto the upper face of the supporting substrate 13), and consequently to suppress the optical waveguide 10 from hanging down; thus, a more stable optical coupling structure can be achieved.

As described above, the optical cable module relating to the present invention is provided with an optical waveguide, formed by surrounding a core by a clad layer, and a light-receiving/emitting element, installed on a supporting substrate, and the optical waveguide has an optical path conversion mirror that converts the direction of an optical path of an optical signal to be transmitted through the core, with the light releasing face from the optical waveguide or the light incident face into the optical waveguide being made so as to face the light-receiving face or the light-emitting face of the light-receiving/emitting element, and in this arrangement, supposing that the amount of protrusion of waveguide from the end of the supporting face for supporting the optical waveguide on the supporting substrate to the center of the optical path conversion mirror in the core of the optical waveguide is L, that the load of the waveguide per unit length is w, that the cross-section secondary moment of the waveguide is Iz and that the longitudinal elastic modulus of the waveguide is E, the amount of protrusion of waveguide L is allowed to satisfy the following relationship:

$$1.0 \geq (wL^3/6EIz) \cdot (180/\pi)$$

Here, supposing that an angle, made by the light-releasing face (or light-incident face) on the tip of the optical waveguide and the light-releasing face (or light-incident face) of the optical waveguide in a state where there is no deflection (hanging down) in the optical waveguide, is defined as an hanging-down angle θ of the tip of the waveguide, the following relationship is satisfied:

$$\theta = (wL^3/6EIz) \cdot (180/\pi)$$

Moreover, the load w per unit length of the waveguide is found by (mass per unit length of the waveguide)×(gravitational acceleration+maximum value of actual applicable acceleration), with the permissible angle θmax of the hanging-down angle θ of the tip of the waveguide being set to about 1.0°. Therefore, by limiting the amount of protrusion of waveguide L in an optical cable module to a value that satisfies the following inequality:

$$1.0 \geq (wL^3/6EIz) \cdot (180/\pi),$$

the hanging-down angle θ of the tip of the waveguide can be suppressed to 1.0° or less that is a permissible angle range so that the amount of deflection that occurs in the optical waveguide can be restricted to a degree that causes no failure in transmitting an optical signal.

Moreover, in the optical cable module, the above-mentioned amount of protrusion of waveguide L is preferably set to 400 μm or less.

Moreover, another optical cable module relating to the present invention is an optical cable module, provided with an optical waveguide, formed by surrounding a core by a clad layer, and a light-receiving/emitting element, installed on a supporting substrate as described above, and the light releasing face from the optical waveguide or the light incident face into the optical waveguide is made so as to face the light-receiving face or the light-emitting face of the light-receiving/emitting element, and in this arrangement, the optical waveguide is provided with a reinforcing member that is placed on a face of the optical waveguide on the side having the light input/output face and/or the side having no light input/output face, at a protruding portion from the supporting face of the optical waveguide on the supporting substrate.

Thus, by placing the reinforcing member on the upper face (face on the side having no light input/output face) or the lower face (face on the side having the light input/output face) of the optical waveguide, the occurrence of deflection in the optical waveguide can be suppressed, and the amount of deflection that occurs in the optical waveguide can be consequently restricted to a degree that causes no failure in transmitting an optical signal.

Still another optical cable module relating to the present invention is provided with an optical waveguide, formed by surrounding a core by a clad layer, and a light-receiving/emitting element, installed on a supporting substrate as described above, and the optical waveguide is provided with an optical path conversion mirror that converts the direction of an optical path of an optical signal to be transmitted through the core, with the light releasing face from the optical waveguide or the light incident face into the optical waveguide being made so as to face the light-receiving face or the light-emitting face of the light-receiving/emitting element, and the light-receiving/emitting element is sealed with a sealing resin, with a void being formed between the surface of the sealing resin on the light-receiving face or the light-emitting face of the light-receiving/emitting element and the light releasing face or the light incident face of the optical waveguide, and supposing that on the supporting substrate, the amount of protrusion of waveguide from the end of the supporting face for supporting the optical waveguide on the supporting substrate to the center of the optical path conversion mirror in the core of the optical waveguide is L, and that the width in the optical waveguide optical-axis direction of a fillet generated in the sealing resin is F, the following relationship is satisfied:

$$L \geq F$$

Here, the fillet, discussed here, refers to a portion where the applied sealing resin prior to curing is raised by a surface tension on an interface (interface perpendicular to the optical axis of the optical waveguide) relative to the supporting substrate, and the surface thereof forms a cured portion that is not in parallel with the light-receiving/emitting face of the light-receiving/emitting element. Moreover, the fillet width F of the sealing resin refers to a width in the optical axis direction of the optical waveguide in an area in which the angle, made by the surface of the sealing resin and the light-receiving/emitting face of the light-receiving/emitting element, is set to 5° or more.

For this reason, it becomes possible to avoid a problem in which the fillet extends onto the area on the light-receiving/emitting face of the light-receiving/emitting element to give adverse effects (degradation of transmission efficiency or the like) to the transmission of an optical signal.

Moreover, in the optical cable module, the amount of protrusion of waveguide L is preferably set to 100 μm or more.

Furthermore, the optical cable module may have a structure in which a concave portion or a convex portion is formed on the face of the supporting substrate with which the surface of the sealing resin is made in contact. Alternatively, the optical cable module may have a structure in which a step difference is formed on the face of the supporting substrate with which the surface of the sealing resin is made in contact.

For this reason, since the sealing resin is formed in a manner so as to provide a void between the sealing resin and the optical waveguide, the optical cable module is arranged so that, after the sealing resin has been cured, the optical waveguide is secured onto the supporting substrate. At this time, if the sealing resin extends further to cover the supporting face for the optical waveguide of the supporting substrate, it is not possible to accurately carry out a positioning process of the optical waveguide.

Here, the reason that the sealing resin extends over to the surface of the supporting substrate is because the sealing resin expands along the contact face of the supporting substrate with the sealing resin by its surface tension. With the above-mentioned arrangement, by forming a concave portion or a convex portion, or a step difference on the contact face of the supporting substrate with the sealing resin, it becomes possible to prevent the sealing resin from extending onto the supporting face of the optical waveguide on the supporting substrate.

Moreover, the optical cable module may have a structure in which a member having higher wettability than the supporting substrate is affixed to the surface of the supporting substrate with which the surface of the sealing resin is made in contact, or a structure in which a material that improves the surface wettability is applied to the surface of the supporting substrate with which the surface of the sealing resin is made in contact.

By improving the wettability of the contact face with the sealing resin of the supporting substrate, it becomes possible to prevent the sealing resin from extending onto the supporting face for the optical waveguide of the supporting substrate.

Moreover, the optical cable module may have a structure in which the above-mentioned light-receiving/emitting element is sealed with a sealing resin, with a void being formed between the surface of the sealing resin on the light-receiving face or the light-emitting face of the light-receiving/emitting element and the light-releasing face or the light-incident face of the waveguide, and when the tilt angle θ of the optical path conversion mirror is defined as an angle made relative to the core optical axis of the optical waveguide, the tilt angle θ is set to an angle smaller than 45°.

With this arrangement, the light-receiving/emitting element is disposed on an area that is free from a fillet formation of the sealing resin, and an optical coupling between the optical waveguide and the light-receiving/emitting element is obtained even when the amount of protrusion of the waveguide is small (even when the light path conversion mirror formed at the tip of the optical waveguide is not located right above the light-receiving/emitting element). That is, a structure that can reduce the amount of protrusion of the optical waveguide is achieved so that the amount of deflection that occurs in the optical waveguide can be reduced.

Moreover, the optical cable module may have a structure in which the light-receiving/emitting element is disposed within a fillet generation area of the sealing resin.

Therefore, even in a case where the light-receiving/emitting element is disposed within the fillet generation area on the surface of the sealing resin, upon optically coupling the optical waveguide and the light-receiving/emitting element to each other, refraction by the angle of the fillet surface is utilized so that since the light-receiving/emitting element can be disposed at a position closer to the supporting face side of the optical waveguide on the supporting substrate, the amount of protrusion L of the waveguide of the optical waveguide is made further smaller.

The present invention is not intended to be limited by the above-mentioned embodiments, and various modifications may be made therein within the scope of the following claims. That is, those embodiments, obtained by combining technical means modified within the scope of the following claims on demand, are also included in the technical scope of the present invention.

The invention claimed is:

1. An optical cable module comprising:
   an optical waveguide formed by surrounding a core with a clad layer and a light-receiving/emitting element, installed on a supporting substrate, wherein
   the optical waveguide is formed into a film shape having flexibility, and has an optical path conversion mirror that converts a direction of an optical path of an optical signal to be transmitted through the core,
   the optical waveguide has a tip portion that is placed so as to protrude in an optical axis direction from an end of a supporting face that supports the optical waveguide on the supporting substrate,
   a light-releasing face of the optical waveguide or a light-incident face of the optical waveguide is aligned so as to face a light-receiving face or a light-emitting face of the light-receiving/emitting element, and
   wherein, on the supporting substrate,
      an amount of protrusion of the optical waveguide from the end of the supporting face supporting the optical waveguide to the center of the optical path conversion mirror in the core is represented by L(m),
      a load of the optical waveguide per unit length is represented by w(N/m),
      a cross-section secondary moment of the optical waveguide is represented by $Iz(m^4)$,
      a longitudinal elastic modulus of the optical waveguide is represented by E(Pa), and the amount of protrusion L of the optical waveguide satisfies the following relationship:

$$1.0 \geq (wL^3/6Eiz)\cdot(180/\pi).$$

2. The optical cable module according to claim 1, wherein the amount of protrusion of waveguide L is 400 μm or less.

3. The optical cable module according to claim 1,
wherein the light-receiving/emitting element is sealed with a sealing resin, with a void being formed between a surface of the sealing resin on a light-receiving face or a light-emitting face of the light-receiving/emitting element and a light-releasing face or a light-incident face of the optical waveguide, and
wherein a tilt angle θ of the optical conversion mirror is defined as an angle to be made relative to the optical axis of the core of the optical waveguide, and the tilt angle θ is set to an angle smaller than 45°.

4. The optical cable module according to claim 3, wherein the light-receiving/emitting element is placed within a fillet generation area in the sealing resin.

5. An optical cable module comprising:
an optical waveguide formed by surrounding a core with a clad layer and a light-receiving/emitting element, installed on a supporting substrate,
wherein the optical waveguide is provided with an optical path conversion mirror that converts a direction of an optical path of an optical signal to be transmitted through the core,
a light-releasing face of the optical waveguide or a light-incident face of the optical waveguide is aligned so as to face a light-receiving face or a light-emitting face of the light-receiving/emitting element,
the light-receiving/emitting element is sealed with a sealing resin, with a void being formed between a surface of the sealing resin on a light-receiving face or a light-emitting face of the light-receiving/emitting element and a light-releasing face or a light-incident face of the optical waveguide, and
wherein, on the supporting substrate,
an amount of protrusion of waveguide from the end of the supporting face supporting the optical waveguide to the center of the optical path conversion mirror in the core is represented by L(m),
a width in an optical axis direction of the optical waveguide of a fillet generated in the sealing resin is represented by F(m), and
the following relationship is satisfied: L≧F.

6. The optical cable module according to claim 5, wherein the amount of protrusion of waveguide L is 100 μm or more.

* * * * *